R. F. HALL.
MACHINE FOR THE MANUFACTURE OF GLASS ARTICLES.
APPLICATION FILED JULY 27, 1920.
1,408,939.
Patented Mar. 7, 1922.
2 SHEETS—SHEET 1.
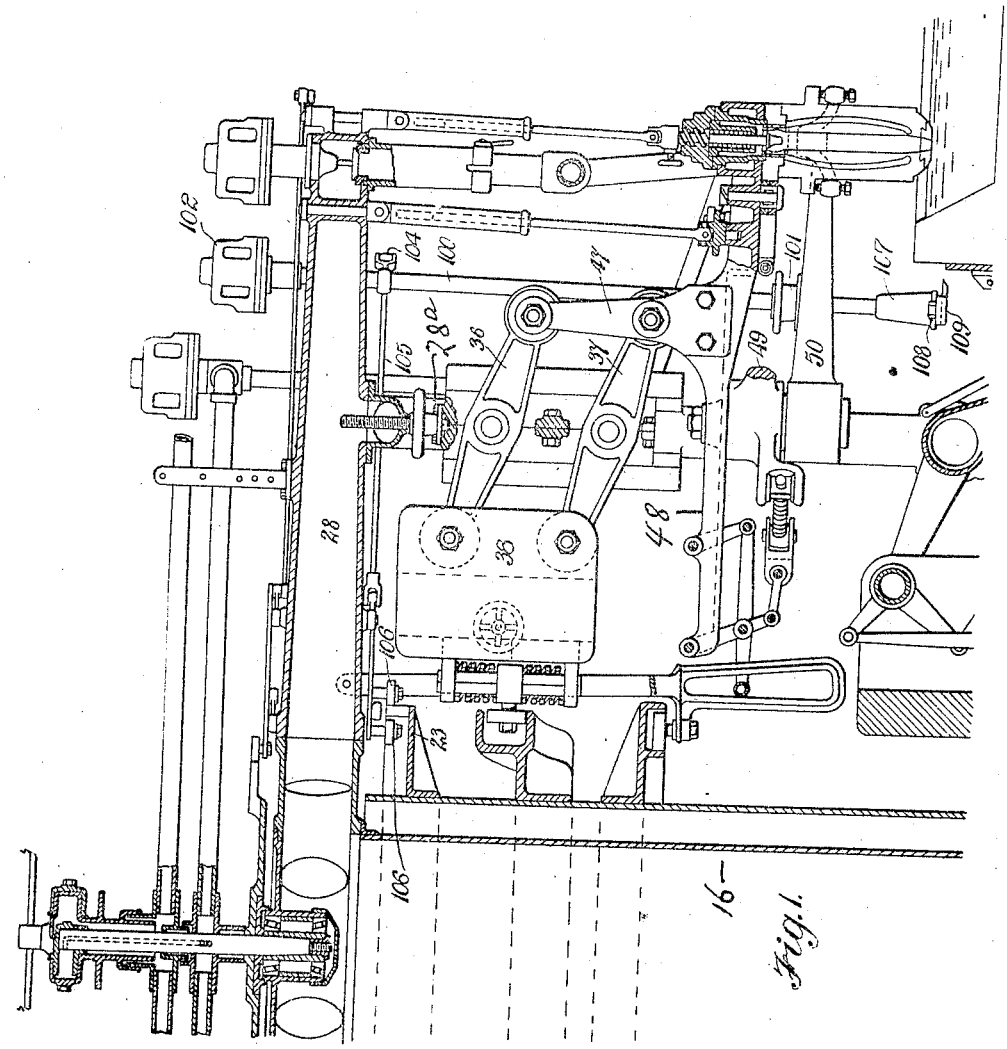
Inventor:
Robert F. Hall
By his Attorneys,
Baldwin & Wight

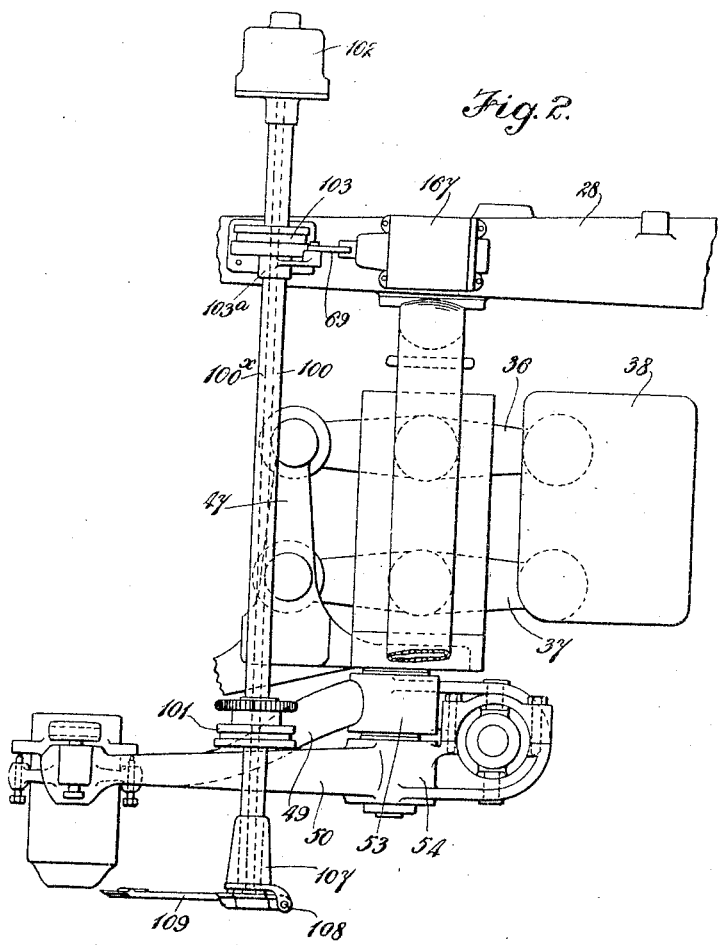

UNITED STATES PATENT OFFICE.

ROBERT FREDERICK HALL, OF MOSELEY, NEAR BIRMINGHAM, ENGLAND.

MACHINE FOR THE MANUFACTURE OF GLASS ARTICLES.

1,408,939.     Specification of Letters Patent.     Patented Mar. 7, 1922.

Original application filed March 13, 1918, Serial No. 222,257. Divided and this application filed July 27, 1920. Serial No. 399,431.

(GRANTED UNDER THE PROVISIONS OF THE ACT OF MARCH 3, 1921, 41 STAT. L., 1313.)

*To all whom it may concern:*

Be it known that I, ROBERT FREDERICK HALL, a subject of the King of Great Britain and Ireland, residing at Moseley, near Birmingham, in the county of Warwick, England, have invented certain new and useful Improvements in Machines for the Manufacture of Glass Articles, (for which I have filed an application in England, No. 9,922, filed July 10, 1917, patent sealed Nov. 12, 1921, No. 165,800; also a divisional application, bearing date of July 10, 1917, No. 14,369 of 1918, patent sealed Dec. 6, 1921, No. 165,112,) of which the following is a specification.

This application is a divison of my application for patent No. 222,257, filed March 13, 1918.

This invention relates to improvements in machines for manufacturing glass articles, and refers more particularly to the mounting and operation of the knife which is used for cutting off the trailing glass from the bottom of the parison mould in a machine of the Owens or analogous type, such as that shown in my co-pending application 399,427, filed July 27, 1920.

It will be evident that in a machine of the said type the parison mould is subjected to a movement composed of three elements, viz., vertical, horizontal and arcing elements.

The object of the present invention is to so mount and operate the knife and its connections that irrespective of the above mentioned complex movement of the parison mould all the requisite movements of the knife are provided for, and that the knife can be maintained in the proper operative position relatively to the parison mold.

A further object of the invention is to provide a knife and means for operating it so arranged that it will move close to the bottom of the parison mold when moving in one direction, but can be lowered away from the bottom thereof when moving in the opposite direction.

In order that my said invention may be clearly understood, I will now proceed to describe the same with reference to the accompanying drawings.

Fig. 1 is a diagrammatic sectional elevation of the machine showing the knife constructed and operated according to one method of carrying out the invention.

Fig. 2 shows a diagrammatic elevation of a portion of the machine illustrating the knife with another form of operating means.

The same numerals of reference are employed to denote the same parts in all the views, both as regards the present specification and the specifications of my co-pending applications Serial Numbers 399,427 and 399,429, both filed July 27, 1920.

In these co-pending applications I have shown a revolving frame having radially extending arms from which depend or beneath which are carried the different mechanisms and parts for blowing a bottle or other hollow glass article. In Fig. 1 of the drawing, 16 indicates a central stationary part of the machine, and 28 is one of the radial arms on the revolving frame. Extending downwardly from arm 28 to an annulus at the bottom of the revolving frame (not shown in this application) is a vertical column $28^a$ on which are pivotally carried levers 36 and 37. One end of each of the levers 36 and 37 is pivotally connected with the vertically movable weight 38, while suspended from the other ends of the levers 36 and 37 by links 47 is the casting 48 which carries a vertical pin that forms the bearings for the parison mold arms 49 and 50. Thus a parallel link motion is obtained for raising the frame 48 when the weight 38 is lowered by the cam mechanism described in my co-pending applications hereinbefore referred to, and vice versa. As the frame 48 is raised it will be moved away from the center structure at 16, and as it lowers it will move nearer thereto, due to the fact that the levers 36 and 37 swing in an arc.

Mechanism is also provided for swinging the arms 49 and 50 on their respective bearing portions 53 and 54 in a horizontal plane to open and close the parison mold sections at the proper time. Thus, it may be seen that in addition to the up and down movement of the arms 49 and 50, effected through levers 36 and 37, the arms move in two other directions, i. e., they swing in a horizontal plane and move toward or away from the central structure 16 with the frame member or casting 48.

Inasmuch as it is desirable that the knife for cutting the molten glass which "trails" or adheres to the parison mold after it has been withdrawn from the pot of molten glass, be so arranged that it will always be in a position to cut the glass, the knife and its operating parts must be arranged so that it will follow the parison mold through its complicated movement in the three directions above specified, and this is preferably done by attaching the knife supporting means, in the manner hereinafter described, to the arm 50.

100 is a tube which passes through a suitable bearing 103, at the side of the arm 28. This bearing is so formed that it admits of a rocking or universal motion. A bearing of the "Skefko" type is suitable for the purpose. This bearing also permits the tube 100 to slide vertically therein in addition to allowing it to rock with a universal motion.

Carried at the top of the tube 100 is in this case the coil 102 of a solenoid, for the purpose of giving the necessary vertical element of the knife's movements.

103ª is a sleeve slidable on the tube 100 a feather and featherway being provided for causing the tube 100 to rotate with the sleeve 103ª. Keyed to the sleeve is an arm 104 pivoted to a rod 105 controlled by cam rollers 106 in connection with the double acting cam 23.

The tube 100 passes down through a similar rocking bearing 101, located upon a lug on one of the arms carrying the parison mould and is provided at the bottom with a sleeve 107 carrying a downwardly turned plate to which is hinged at 108 an arm 109 having the knife attached thereto at the end. The bearing at 101 differs from the bearing 103 on arm 28 in that the tube 100 is not vertically movable therein. Thus when arm 50 moves up or down, tube 100 moves therewith, but slides in the bearing 103 on arm 28. Both of the bearings, 103 and 101, however, permit of the universal or rocking movement.

Passing down the tube 100 is a rod 100ˣ which in this case is provided at the top in the neighbourhood of the solenoid 102 with a magnetizable core, and the construction is such that when current is passed the rod presses down the knife to a small extent and removes it from contact with the bottom of the parison.

It will thus be seen that the cutting off motion is obtained by the rotation of the tube 100 from the cam 23 whilst the disengagement of the knife from the bottom of the parison is obtained electrically from the solenoid 102. It is not essential that the arrangement employing tube 100 and the rod 100ˣ be employed, with the knife mounted on a hinge. In practice, however, it is desirable to have the knife pass close to the bottom of the parison mold to cut the glass and to then have means for giving it a slight downward movement before it is turned back, as otherwise a scar or mark might be made on the bottom of the bottle by the return movement of the knife.

As the tube 100 can slide through the rocking bearing and through the sleeve 103ª, the tube can accomodate itself to the various positions of the arm 50 and its motions are not in any way impeded.

At Fig. 2 is shown another construction, in which the operation of the knife is effected entirely by electrical means.

In place of rotating the tube 100 by means of a rod operated from a cam in this case a solenoid 167 is mounted upon the arm 28 and the core of this solenoid 167 is connected to the sleeve 103ª by means of a suitable arm 69 by which the rotation of the sleeve and consequently the rod is effected, when the solenoid is energized.

As in the previous case the inner rod for depressing the knife is operated from the solenoid at the top.

It will be obvious that other means, for instance a cam or fluid pressure motor may be employed for operating the rod 100ˣ.

I claim—

1. A machine for blowing hollow glass articles including a rotatable frame, a parison mold carried thereby, means for actuating the parison mold including an oscillating arm movable relatively to the frame in three directions, a knife adapted to be swung beneath the parison mold, a vertically extending member on which the knife is carried, means for rotating the vertically extending member for swinging the knife beneath the parison mold, and bearings on the frame and on the arm arranged to maintain the knife and the vertically extending member in proper position irrespective of the relative movement between the arm and frame.

2. A machine for blowing hollow glass articles including a rotatable frame, a parison mold carried thereby, means for actuating the parison mold including an oscillating arm movable relatively to the frame in three directions, a knife adapted to be swung beneath the parison mold, a vertically extending member on which the knife is carried, means for rotating the vertically extending member for swinging the knife beneath the parison mold, a bearing on the arm in which the vertically extending member is journaled having a universal movement, and a second bearing on the frame having a universal movement and through which the vertically extending member is slidably and rotatably passed, whereby the knife is maintained in proper position relatively to the parison mold irrespective of the movement of said arm relatively to the frame.

3. A machine for blowing hollow glass articles including a supporting frame, a parison mold carried thereby, means for actuating the parison mold including a member movable in a plurality of directions relatively to the supporting frame, a knife adapted to be swung in an arc beneath the parison mold, a vertically extending member on which the knife is carried, means for rotating the vertically extending member to effect the swinging movement of the knife beneath the parison mold, bearings having a universal movement on the frame and on the relatively movable parison mold actuating member in which the vertically extending member is journaled, the vertically extending member also being slidable vertically in the bearing on the frame, whereby the knife is maintained in proper position irrespective of the relative movement of the parison mold actuating member.

4. A machine for blowing hollow glass articles including a supporting frame, a parison mold carried thereby, means for actuating the parison mold including a member movable in a plurality of directions relatively to the supporting frame, a knife adapted to be swung in an arc beneath the parison mold, a vertically extending member on which the knife is carried, means for rotating the vertically extending member to effect the swinging movement of the knife beneath the parison mold, bearings on the frame and on the said parison mold actuating member arranged to maintain the knife and the vertically movable member in proper position irrespective of the relative movement between said parison mold actuating member and the frame, and means for imparting a vertical movement to the knife to lower it when it swings in one direction beneath the parison mold, said means being inoperative when the knife swings in the opposite direction.

5. A machine for the manufacture of hollow glass articles including a supporting frame, a parison mold carried thereby, means for supporting and actuating the parison mold, including an arm movable in three directions relatively to the frame, a knife adapted to be swung in an arc beneath the parison mold, a vertically extending tube on which the knife is hinged, a rod movable vertically within the tube for effecting a vertical movement of the knife on its hinge relatively to the tube and parison mold, a bearing having a universal movement on the frame through which the tube is slidably and rotatably passed, a bearing on the arm having a universal movement through which the tube is only rotatively passed, means for effecting the rotation of the tube to swing the knife, and means for effecting a vertical reciprocation of the rod within the tube.

6. A machine for the manufacture of hollow glass articles including a supporting frame, a parison mold carried thereby, means for supporting and actuating the parison mold including an arm movable in three directions relatively to the frame, a knife adapted to be swung in an arc beneath the parison mold, a vertically extending tube on which the knife is hinged, a rod movable vertically within the tube for effecting a vertical movement of the knife on its hinge relatively to the tube and parison mold, a bearing having a universal movement on the frame through which the tube is slidably and rotatably passed, a bearing on the arm having a universal movement through which the tube is only rotatively passed, means including a sleeve feathered on the tube and having a crank connected with horizontally reciprocable means for effecting the rotation of the tube to swing the knife, and means for effecting a vertical reciprocation of the rod within the tube.

7. A machine for blowing hollow glass articles including a supporting frame, a parison mold carried thereby, means for actuating the parison mold including a member movable in a plurality of directions relatively to the supporting frame, a knife adapted to be swung in an arc beneath the parison mold, a vertically extending member on which the knife is carried, means including a sleeve feathered on the vertically extending member and having a crank connected with horizontally reciprocable means for rotating the vertically extending member to effect the swinging movement of the knife beneath the parison mold, bearings having a universal movement on the frame and on the relatively movable parison mold actuating member in which the vertically extending member is journaled, the vertically extending member also being slidable vertically in the bearing on the frame, whereby the knife is maintained in proper position irrespective of the relative movement of the parison mold actuating member.

In testimony whereof, I have hereunto subscribed my name.

ROBERT FREDERICK HALL.